(12) United States Patent
Nakata et al.

(10) Patent No.: US 11,173,553 B2
(45) Date of Patent: Nov. 16, 2021

(54) CUTTING TOOL

(71) Applicant: SUMITOMO ELECTRIC HARDMETAL CORP., Itami (JP)

(72) Inventors: Shinya Nakata, Itami (JP); Yuki Tsutsumi, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 0 days.

(21) Appl. No.: 16/300,125

(22) PCT Filed: Apr. 19, 2017

(86) PCT No.: PCT/JP2017/015729
§ 371 (c)(1),
(2) Date: Nov. 9, 2018

(87) PCT Pub. No.: WO2017/199667
PCT Pub. Date: Nov. 23, 2017

(65) Prior Publication Data
US 2019/0143423 A1 May 16, 2019

(30) Foreign Application Priority Data
May 19, 2016 (JP) .............................. JP2016-100714

(51) Int. Cl.
*B23B 51/06* (2006.01)
*B23B 51/04* (2006.01)

(52) U.S. Cl.
CPC .......... *B23B 51/06* (2013.01); *B23B 51/0486* (2013.01); *B23B 2251/08* (2013.01); *B23B 2251/082* (2013.01); *B23B 2251/40* (2013.01)

(58) Field of Classification Search
CPC . B23B 51/0486; B23B 51/06; B23B 2251/08; B23B 2251/082; B23B 2251/40;
(Continued)

(56) References Cited

U.S. PATENT DOCUMENTS 3,313,186 A * 4/1967 Rochon .................. B23B 51/06
76/108.1
3,606,560 A 9/1971 McClennan
(Continued)

FOREIGN PATENT DOCUMENTS

DE 10260136 A1 7/2004
DE 102014013210 A1 3/2016
(Continued)

*Primary Examiner* — Eric A. Gates
(74) *Attorney, Agent, or Firm* — Baker Botts L.L.P.; Michael A. Sartori

(57) ABSTRACT

A cutting tool has a rake face and a flank face. The flank face is provided with a coolant supply hole. A ridgeline between the rake face and the flank face forms a cutting edge. An outer shape of the coolant supply hole in a cross section orthogonal to an axis includes a first portion facing the cutting edge, and a second portion opposite to the cutting edge when viewed from the first portion. The first portion has a concave portion extending toward the second portion. The concave portion is defined by a first side portion and a second side portion facing each other, and a bottom continuous with both the first side portion and the second side portion. In the cross section, an angle formed by a tangent of the first side portion and a tangent of the second side portion is not more than 160°.

5 Claims, 17 Drawing Sheets

(58) Field of Classification Search
CPC ............... Y10T 408/45; Y10T 408/455; Y10T 408/907; Y10T 408/909; Y10T 408/9095; Y10T 408/9097
See application file for complete search history.

(56) References Cited

U.S. PATENT DOCUMENTS

| | | | | |
|---|---|---|---|---|
| 4,704,055 | A * | 11/1987 | Guhring | ................... B22F 5/10 408/144 |
| D602,055 | S * | 10/2009 | Yanagida | ..................... D15/139 |
| 9,004,826 | B2 * | 4/2015 | Wedner | ................ B23B 51/009 408/223 |
| 9,079,255 | B2 * | 7/2015 | Jager | ....................... B23B 51/02 |
| 9,333,564 | B2 * | 5/2016 | Santamarina | ........... B23B 51/02 |
| 9,636,756 | B2 * | 5/2017 | Riester | .................... B23B 51/06 |
| 9,833,843 | B2 * | 12/2017 | Krenzer | ................ B23B 51/009 |
| 2003/0215297 | A1 * | 11/2003 | Frisendahl | .............. B23B 51/02 408/230 |
| 2005/0244236 | A1 * | 11/2005 | Bosman | .................. B23B 51/04 408/59 |
| 2006/0006576 | A1 * | 1/2006 | Karos | ................... B21C 23/147 264/209.2 |
| 2009/0148247 | A1 * | 6/2009 | Nomura | .............. B23B 51/0486 408/59 |
| 2012/0082524 | A1 * | 4/2012 | Matsuda | ................. B23B 51/06 408/59 |
| 2013/0302101 | A1 * | 11/2013 | Scanlon | ................. B23B 51/06 408/59 |
| 2015/0321267 | A1 | 11/2015 | Takai | |
| 2016/0059323 | A1 | 3/2016 | Riester | |

FOREIGN PATENT DOCUMENTS

| | | |
|---|---|---|
| JP | S54-144381 U | 10/1979 |
| JP | 2011-020255 A | 2/2011 |
| WO | 2014/118881 A1 | 8/2014 |

* cited by examiner

CUTTING TOOL

TECHNICAL FIELD

The present disclosure relates to cutting tools, and more specifically to a cutting tool with a coolant hole configured to rotate around an axis. The present application claims priority to Japanese Patent Application No. 2016-100714 filed on May 19, 2016, the entire contents of which are incorporated herein by reference.

BACKGROUND ART

In a cutting tool with a coolant hole, the coolant hole generally has a round cross-sectional shape. To increase a supply amount of a coolant to suppress temperature increase at a cutting edge, however, cutting tools having different cross-sectional shapes of a coolant hole have been proposed.

Japanese Patent Laying-Open No. 2011-20255 (PTL 1), for example, describes a drill with a coolant hole, in which the coolant hole has a substantially triangular cross-sectional shape. The drill is formed such that an interval between inner wall surfaces of the coolant hole is gradually increased toward the outer circumference, and a percentage of the increase is gradually increased toward the outer circumference.

WO 2014/118881 (PTL 2) describes a drill with a coolant hole, in which the coolant hole has a substantially trapezoidal cross-sectional shape. The coolant hole is surrounded by a front inner wall surface, a rear inner wall surface facing the front inner wall surface, an outer circumferential inner wall surface, and an inner circumferential inner wall surface having a curvature radius smaller than a curvature radius of the outer circumferential inner wall surface.

CITATION LIST

Patent Literature

PTL 1: Japanese Patent Laying-Open No. 2011-20255
PTL 2: WO 2014/118881

SUMMARY OF INVENTION

A cutting tool according to one aspect of the present disclosure is a cutting tool configured to rotate around an axis, including: a rake face; and a flank face continuous with the rake face. The flank face is provided with a coolant supply hole. A ridgeline between the rake face and the flank face forms a cutting edge. An outer shape of the coolant supply hole in a cross section orthogonal to the axis includes a first portion facing the cutting edge when viewed from a direction parallel to the axis, and a second portion opposite to the cutting edge when viewed from the first portion. The first portion has a concave portion extending toward the second portion. The concave portion is defined by a first side portion and a second side portion facing each other, and a bottom continuous with both the first side portion and the second side portion. In the cross section, an angle formed by a tangent of the first side portion and a tangent of the second side portion is not more than 160°.

DETAILED DESCRIPTION

Figure 1:
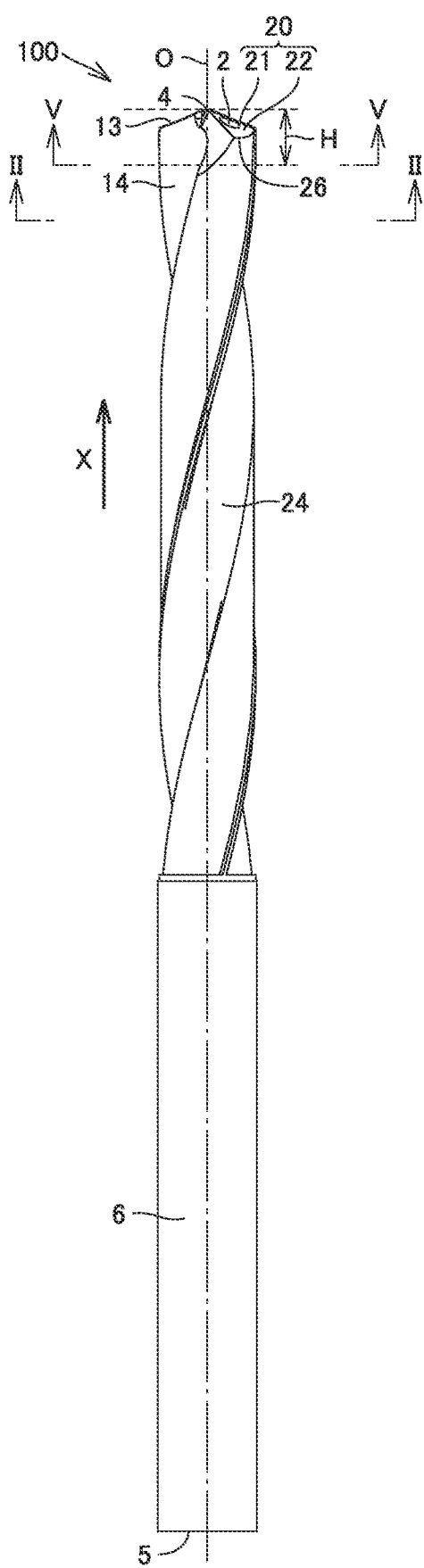
FIG. 1 is a schematic plan view showing the structure of a drill according to the present embodiment.

Problem to be Solved by the Present Disclosure

Increasing the cross-sectional area of a coolant hole improves the effect of cooling a cutting edge. However, the increased cross-sectional area causes a reduced thickness of a tool main body, resulting in reduced strength of the cutting tool and an increased risk of breakage of the tool during machining. It is therefore desirable to increase the cross-sectional area of the hole to increase a flow rate of a coolant to thereby efficiently supply the coolant to the cutting edge, while minimizing the reduction in strength of the cutting tool.

When performing cutting while rotating the drill described in Japanese Patent Laying-Open No. 2011-20255, a centrifugal force acts on a coolant, causing some of the coolant to flow rearward (toward a heel) in a rotational direction through the outer circumferential side of a flank face from the coolant hole, and the remaining coolant to flow rearward (toward the heel) in the rotational direction through the inner circumferential side of the flank face from the coolant hole. In the drill described above, therefore, the coolant cannot be effectively supplied toward a central portion of a cutting edge located forward in the rotational direction when viewed from the coolant hole, and toward an outermost peripheral portion of the cutting edge that has the highest cutting speed and significantly increases in temperature.

An object of one aspect of the present disclosure is to provide a cutting tool in which a flow rate of a coolant can be increased to efficiently supply the coolant toward a central portion and an outermost peripheral portion of a cutting edge, while reduction in strength of the cutting tool is minimized.

Advantageous Effect of the Present Disclosure

According to one aspect of the present disclosure, there can be provided a cutting tool in which a flow rate of a coolant can be increased to efficiently supply the coolant toward a central portion and an outermost peripheral portion of a cutting edge, while reduction in strength of the cutting tool is minimized.

Summary of Embodiment of the Present Disclosure

First, a summary of an embodiment of the present disclosure is provided.

(1) A cutting tool 100 according to one aspect of the present disclosure is cutting tool 100 configured to rotate around an axis O, including: a rake face 14a; and a flank face 10 continuous with rake face 14a. Flank face 10 is provided with a coolant supply hole 1. A ridgeline between rake face 14a and flank face 10 forms a cutting edge 13. An outer shape 30 of coolant supply hole 1 in a cross section S orthogonal to axis O includes a first portion 31 facing cutting edge 13 when viewed from a direction parallel to axis O, and a second portion 32 opposite to cutting edge 13 when viewed from first portion 31. First portion 31 has a concave portion 40 extending toward second portion 32. Concave portion 40 is defined by a first side portion 41 and a second side portion 42 facing each other, and a bottom 43 continuous with both first side portion 41 and second side portion 42. In cross section S, an angle θ1 formed by a tangent 41a of first side portion 41 and a tangent 42a of second side portion 42 is not more than 160°.

In accordance with cutting tool 100 according to (1) described above, first portion 31 facing cutting edge 13 has concave portion 40, and angle θ1 formed by tangent 41a of first side portion 41 and tangent 42a of second side portion 42 of concave portion 40 is not more than 160°. Accordingly, a coolant can be effectively supplied toward a central portion and an outermost peripheral portion of cutting edge 13. In addition, since concave portion 40 extends toward second portion 32, the thickness between cutting edge 13 and an opening 50 can be ensured. As a result, a flow rate of the coolant can be increased while reduction in strength of cutting tool 100 is minimized.

(2) In cutting tool 100 according to (1) described above, second portion 32 may have an outwardly convex shape. By narrowing the dimension of second portion 32 located rearward in a rotational direction, a flow rate of a cutting fluid toward the cutting edge located forward in the rotational direction can be increased.

(3) In cutting tool 100 according to (1) or (2) described above, when viewed from the direction parallel to axis O, in a first direction A parallel to a line connecting an outer peripheral end portion 71 of cutting edge 13 and axis O, outer shape 30 may have a portion 39 decreasing in dimension in a second direction B perpendicular to first direction A, from axis O toward outer peripheral end portion 71. Accordingly, the coolant can be effectively supplied toward the outermost peripheral portion of cutting edge 13.

(4) In cutting tool 100 according to (3) described above, when viewed from the direction parallel to axis O, a maximum dimension of outer shape 30 in first direction A may be greater than a dimension of outer shape 30 from first portion 31 to second portion 32 in second direction B. Accordingly, the coolant can be more effectively supplied toward the outermost peripheral portion of cutting edge 13.

(5) In cutting tool 100 according to (1) described above, outer shape 30 may have a first convex portion 81 continuous with first side portion 41, a second convex portion 82 continuous with second side portion 42, and a third convex portion 83 continuous with both first convex portion 81 and second convex portion 82. Third convex portion 83 extends opposite to cutting edge 13 when viewed from bottom 43. Accordingly, the flow rate of the coolant can be increased.

Details of Embodiment of the Present Disclosure

The details of an embodiment of the present disclosure (hereinafter referred to as the present embodiment) are now described based on the drawings. It should be noted that the same or corresponding parts are designated by the same reference numbers in the following drawings and will not be described repeatedly.

First, the structure of a cutting tool 100 according to the present embodiment is described.

Figure 2:
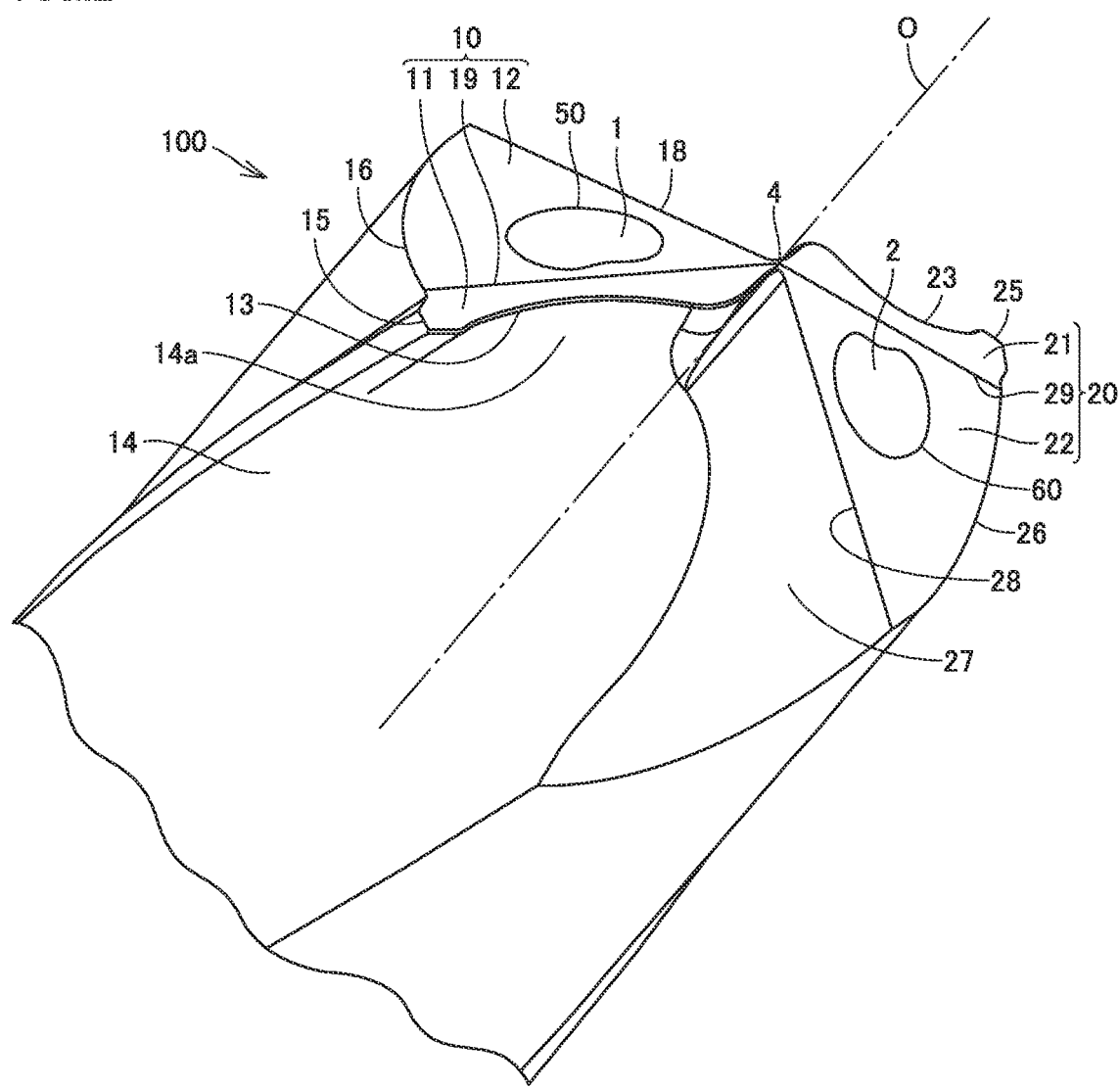
FIG. 2 is a schematic perspective view of a region II in FIG. 1.
Figure 3:
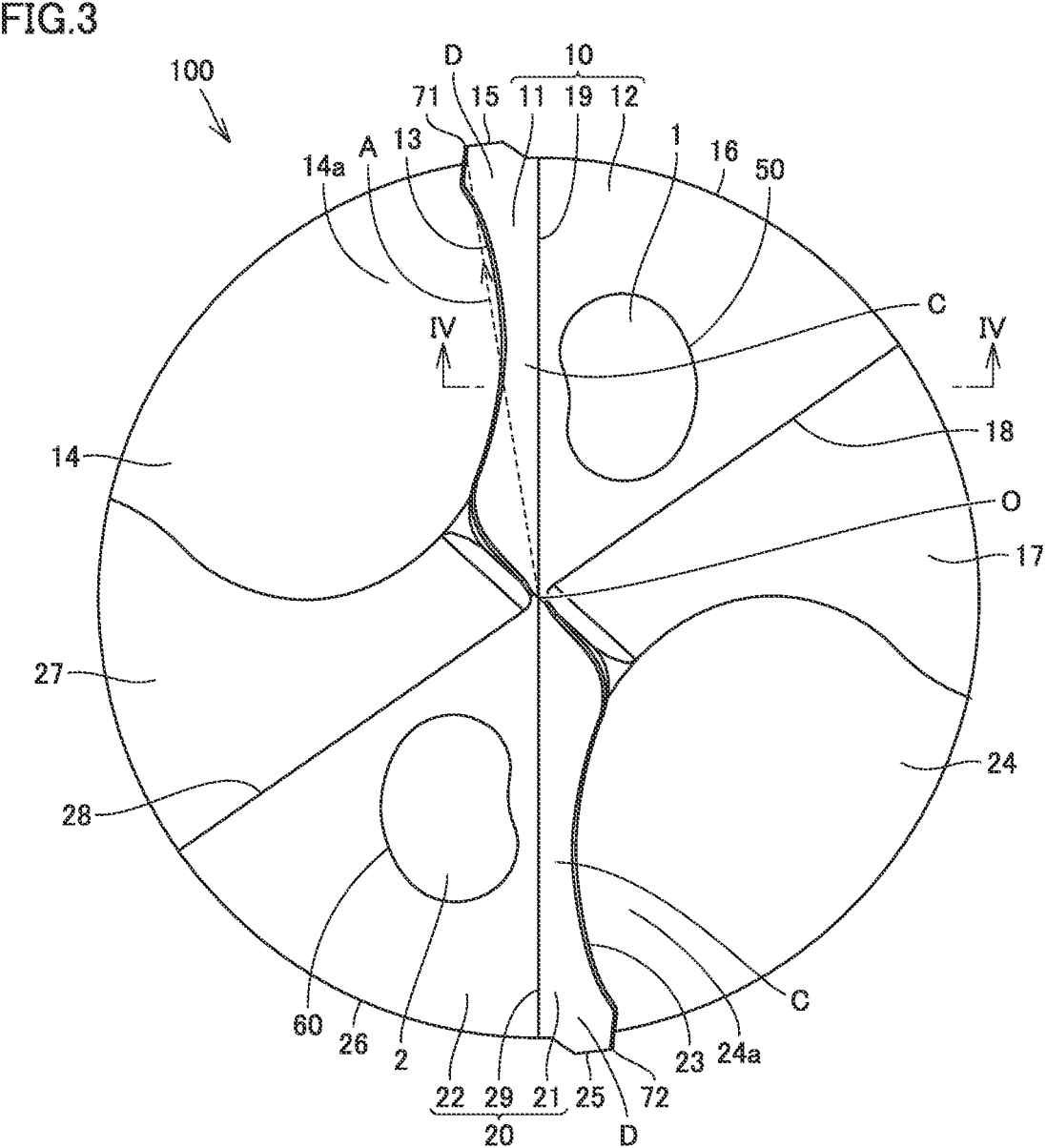
FIG. 3 is a schematic front view showing the structure of the drill according to the present embodiment.

As shown in FIGS. 1 to 3, cutting tool 100 according to the present embodiment is a drill 100 configured to rotate around an axis O, for example, and mainly has a front end portion 4, a rear end portion 5, a shank portion 6, a first rake face 14a, a second rake face 24a, a first flank face 10, a second flank face 20, a first groove portion 14, and a second groove portion 24. First groove portion 14 and second groove portion 24 are swarf ejection grooves. As shown in FIGS. 2 and 3, first flank face 10 is continuous with first rake face 14a. A ridgeline between first rake face 14a and first flank face 10 forms a first cutting edge 13. Similarly, second flank face 20 is continuous with second rake face 24a. A ridgeline between second rake face 24a and second flank face 20 forms a second cutting edge 23.

As shown in FIGS. 1 and 2, first flank face 10 is provided with a first coolant supply hole 1. First coolant supply hole 1 opens both to first flank face 10 and to rear end portion 5. A coolant is introduced from the opening of first coolant supply hole 1 in rear end portion 5, and released from a first opening 50 in first flank face 10. Similarly, second flank face 20 is provided with a second coolant supply hole 2. Second coolant supply hole 2 opens both to second flank face 20 and to rear end portion 5. The coolant is introduced from the opening of second coolant supply hole 2 in rear end portion 5, and released from a second opening 60 in second flank face 20.

As shown in FIG. 3, first flank face 10 is formed of a first front flank face 11 (primary relief) and a first rear flank face 12 (secondary relief). First front flank face 11 may be provided with a first margin portion 15 at its outer peripheral side. First opening 50 opens to first rear flank face 12, for example. First opening 50 may open to first front flank face 11, or may open to traverse a boundary 19 between first front flank face 11 and first rear flank face 12. When viewed from a direction parallel to axis O, first opening 50 is surrounded by first cutting edge 13, a first heel portion 18, and a first outer peripheral portion 16.

Similarly, second flank face 20 is formed of a second front flank face 21 (primary relief) and a second rear flank face 22 (secondary relief). Second front flank face 21 may be provided with a second margin portion 25 at its outer peripheral side. Second opening 60 opens to second rear flank face 22, for example. Second opening 60 may open to second front flank face 21, or may open to traverse a boundary 29 between second front flank face 21 and second rear flank face 22. When viewed from the direction parallel to axis O, second opening 60 is surrounded by second cutting edge 23, a second heel portion 28, and a second outer peripheral portion 26.

As shown in FIG. 3, first flank face 10 is continuous with a first heel face 17 at first heel portion 18. First heel face 17 is continuous with second groove portion 24. First heel portion 18 is linearly elongated when viewed from the direction parallel to axis O. Similarly, second flank face 20 is continuous with second heel face 27 at second heel portion 28. Second heel face 27 is continuous with first groove portion 14. Second heel portion 28 is linearly elongated when viewed from the direction parallel to axis O.

Figure 4:
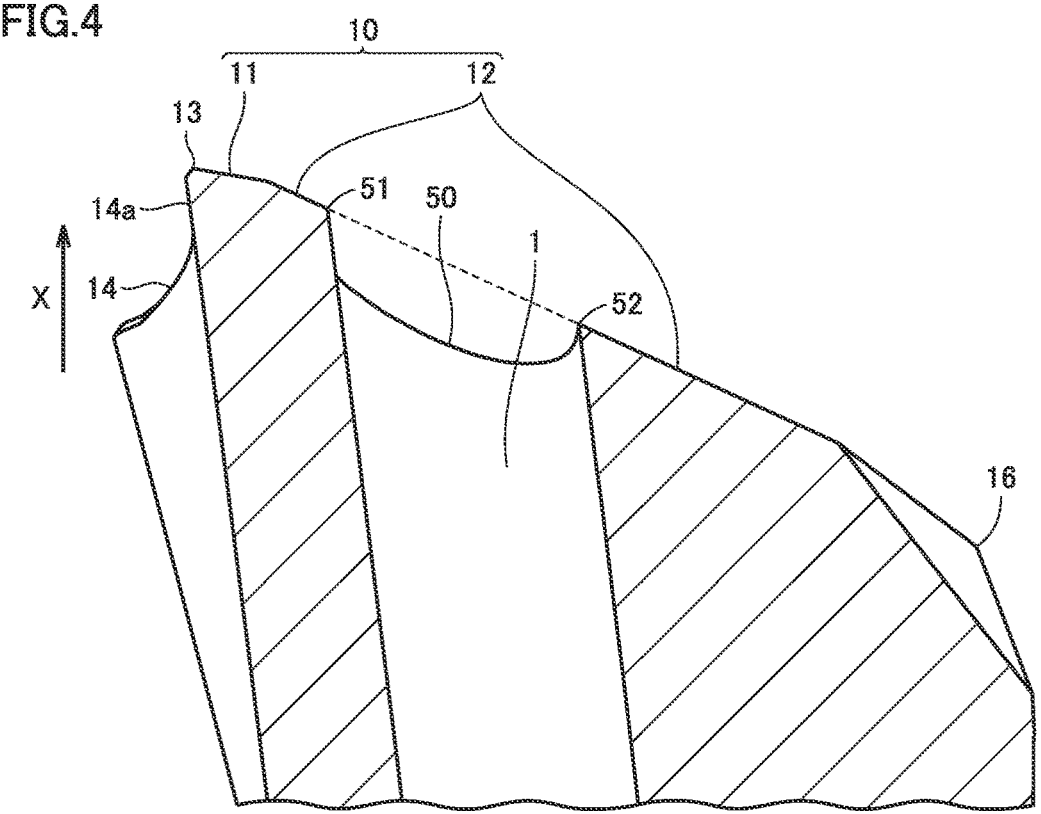
FIG. 4 is a schematic cross-sectional view taken along line IV-IV in a direction of arrows in FIG. 3.

As shown in FIG. 4, first front flank face 11 is tilted toward rear end portion 5 from a plane perpendicular to axis O. First rear flank face 12 is tilted toward rear end portion 5 relative to first front flank face 11. In a direction X parallel to axis O, a portion 51 of first opening 50 positioned closer to first cutting edge 13 is located forward in a rotational direction of the tool, relative to a portion 52 of first opening 50 positioned farther from first cutting edge 13. First rake face 14a may be tilted toward first opening 50 relative to direction X parallel to axis O.

Next, the structure of the first coolant supply hole in a cross section orthogonal to the axis is described.

Figure 5:
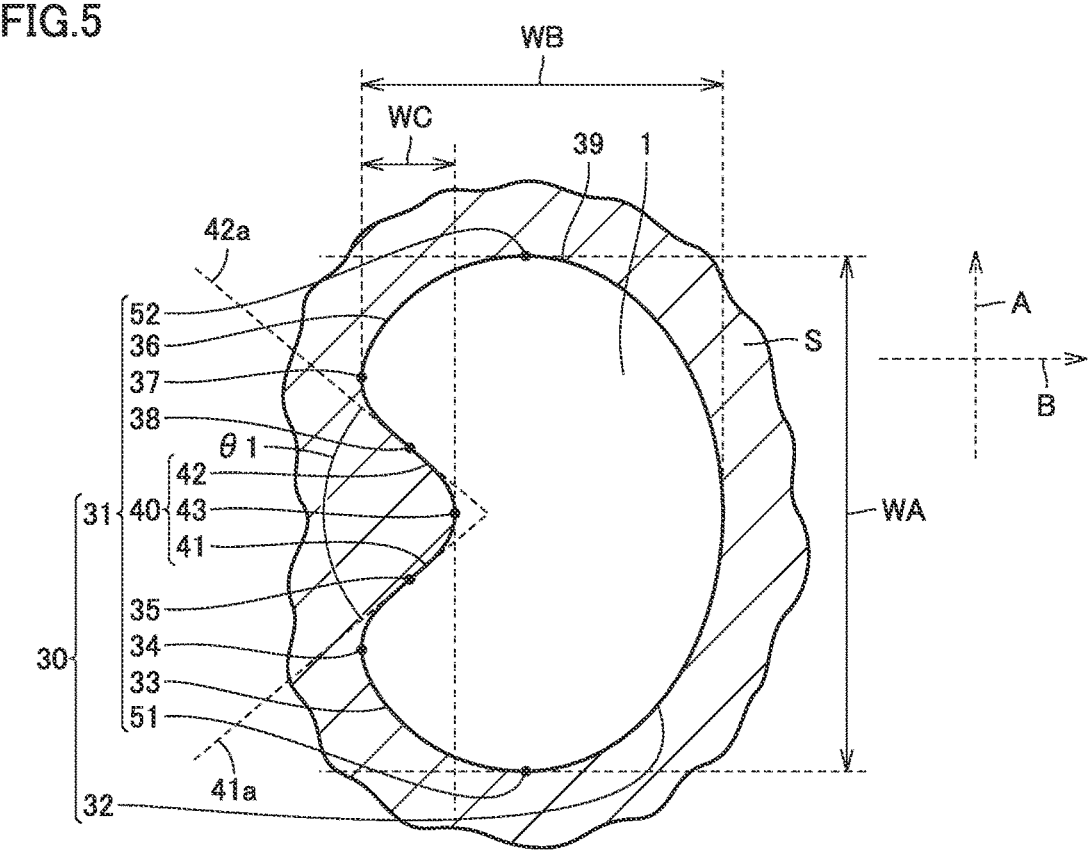
FIG. 5 is a schematic cross-sectional view taken along line V-V in a direction of arrows in FIG. 1.

FIG. 5 shows a portion of a cross section S of cutting tool 100, after cutting tool 100 has been cut at a plane orthogonal to axis O at a position spaced by a distance H (see FIG. 1) from front end portion 4 toward rear end portion 5 of cutting tool 100. Distance H is 5 mm, for example. As shown in FIG. 5, an outer shape 30 of first coolant supply hole 1 in this cross section S is a kidney shape, for example. Outer shape 30 is formed of a first portion 31 and a second portion 32, for example. First portion 31 faces first cutting edge 13 when viewed from the direction parallel to axis O. Second portion 32 is continuous with first portion 31, and is opposite to first cutting edge 13 when viewed from first portion 31. First portion 31 has a concave portion 40 extending toward second portion 32. Concave portion 40 protrudes toward second portion 32. Stated another way, concave portion 40 is inwardly convex. Concave portion 40 has an arc shape, for example. Second portion 32 preferably has an outwardly convex shape in cross section S, but may have an inwardly convex shape.

Concave portion 40 is defined by a first side portion 41 and a second side portion 42 facing each other, and a bottom 43 continuous with both first side portion 41 and second side portion 42. First portion 31 may have concave portion 40, a first convex portion 33 continuous with first side portion 41, and a second convex portion 36 continuous with second side portion 42. First convex portion 33 has a first vertex 34. Second convex portion 36 has a second vertex 37. At least one of first vertex 34 and second vertex 37 is a position of outer shape 30 that is closest to first cutting edge 13. First convex portion 33 and second convex portion 36 each have an arc shape, for example.

As shown in FIG. 3, when viewed from the direction parallel to axis O, first cutting edge 13 may have a portion curved to protrude rearward in the rotational direction.

When viewed from the direction parallel to axis O, bottom 43 of concave portion 40 may face the curved portion of first cutting edge 13. Bottom 43 of concave portion 40 may face the center of first cutting edge 13.

In cross section S, an angle $\theta 1$ formed by a first tangent 41a of first side portion 41 and a second tangent 42a of second side portion 42 is preferably more than 0° and not more than 160°. Better still, angle $\theta 1$ is more effectively not less than 40° and not more than 150°. First tangent 41a is a tangent of a first curve connecting first vertex 34 and bottom 43 at an inflection point of the first curve, for example. Similarly, second tangent 42a is a tangent of a second curve connecting first vertex 34 and bottom 43 at an inflection point of the second curve, for example. First tangent 41a of the first curve at a position between first vertex 34 and bottom 43 is determined, and second tangent 42a of the second curve at a position between second vertex 37 and bottom 43 is determined, such that angle $\theta 1$ formed by first tangent 41a and second tangent 42a is minimized, for example. By setting angle $\theta 1$ at not more than 160°, the coolant can be effectively supplied toward a central portion C of first cutting edge 13.

As shown in FIGS. 3 and 5, when viewed from the direction parallel to axis O, it is assumed that a direction parallel to a line A connecting an outer peripheral end portion 71 of first cutting edge 13 and axis O is a first direction A. As shown in FIG. 5, outer shape 30 of first coolant supply hole 1 may have a narrowed portion 39 decreasing in dimension in a second direction B perpendicular to first direction A, from axis O toward outer peripheral end portion 71. Narrowed portion 39 is formed of a portion of first portion 31 and a portion of second portion 32. Stated another way, narrowed portion 39 includes a boundary between first portion 31 and second portion 32. Accordingly, the coolant can be effectively supplied toward an outermost peripheral portion D of first cutting edge 13. As a result, outer peripheral end portion 71 of first cutting edge 13 which has a high peripheral speed and thus generates a great amount of heat can be effectively cooled.

As shown in FIG. 5, a maximum dimension WA of outer shape 30 in first direction A is preferably greater than a dimension WB of outer shape 30 from first portion 31 to second portion 32 in second direction B. Maximum dimension WA is preferably not less than 1.1 times and not more than 4.0 times dimension WB. Better still, maximum dimension WA is more effectively not less than 1.4 times and not more than 2.0 times dimension WB. If outer shape 30 is a kidney shape (see FIG. 5), then dimension WB is the maximum dimension of outer shape 30 in second direction B. If outer shape 30 is a three-leaf shape (see FIG. 9), then dimension WB is a distance from a first convex portion 81 to a recessed portion 84 in second direction B, or a distance from a second convex portion 82 to a recessed portion 85 in second direction B. A distance WC from first vertex 34 or second vertex 37 to bottom 43 in second direction B (see FIG. 5) is preferably not less than 0.01 times and not more than 0.5 times dimension WB. Better still, distance WC is more effectively not less than 0.03 times and not more than 0.3 times dimension WB.

As shown in FIGS. 3 and 5, when viewed from the direction parallel to axis O, it is assumed that a distance from first vertex 34 of coolant supply hole 1 to line A connecting outer peripheral end portion 71 and axis O in a direction perpendicular to line A is LA, and a distance from second vertex 37 to line A connecting outer peripheral end portion 71 and axis O in the direction perpendicular to line A is LB. Assuming that a cutting edge diameter of the tool (that is, a distance between outer peripheral end portion 71 of first cutting edge 13 and an outer peripheral end portion 72 of second cutting edge 23 when viewed from the direction parallel to axis O) is LD, it is preferable for LA to be not less than 0.03×LD and not more than 0.20×LD, for LB to be within the range from not less than 0.03×LD to not more than 0.20×LD, and for LB/LA to satisfy the relation of not less than 0.8 and not more than 1.3. Accordingly, an increased amount of flow toward the rear in the tool rotational direction of the coolant flowing out of the coolant supply hole can be supplied toward the outer peripheral portion of the cutting edge.

Next, the structure of a first modification of the first coolant supply hole is described.

Figure 6:
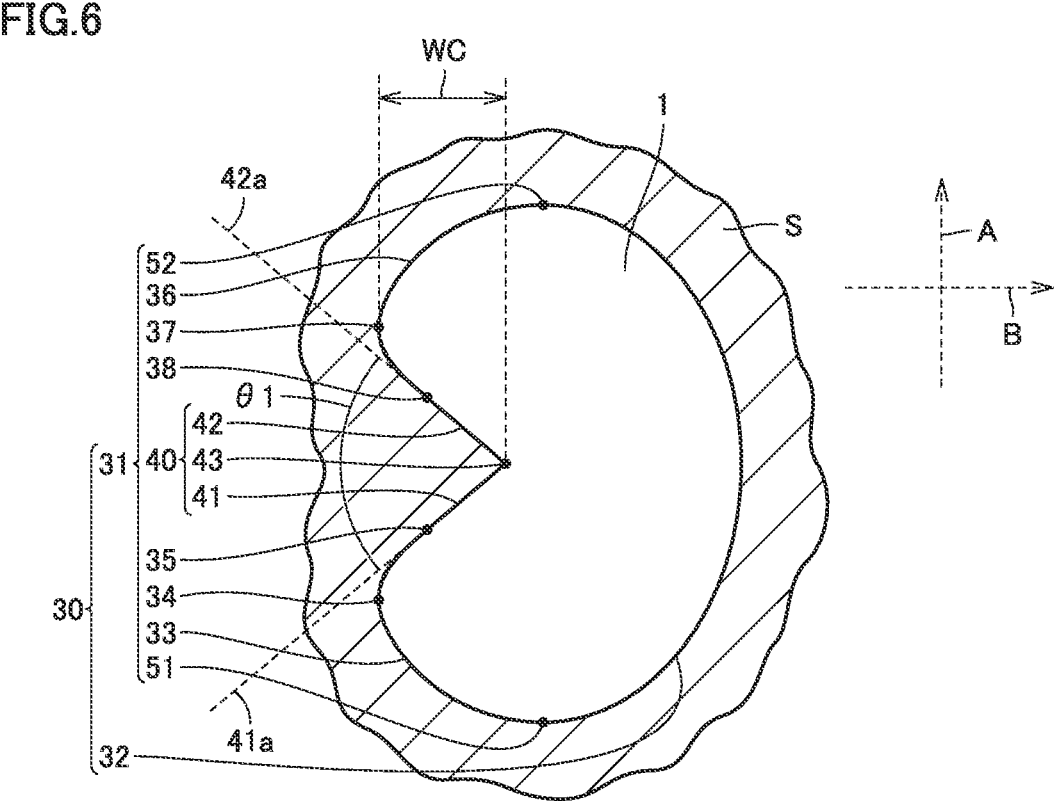
FIG. 6 is a schematic cross-sectional view showing the structure of a first modification of a first coolant supply hole.

As shown in FIG. 6, concave portion 40 may be angular. Bottom 43 of concave portion 40 is pointed toward second portion 32. First side portion 41 and second side portion 42 are linear. Bottom 43 is a vertex connecting the two lines. First tangent 41a is a tangent at a boundary 35 between linear first side portion 41 and curved first convex portion 33, for example. Stated another way, first tangent 41a is a line along first side portion 41. Similarly, second tangent 42a is a tangent at a boundary 38 between linear second side portion 42 and curved second convex portion 36, for example. Stated another way, second tangent 42a is a line along second side portion 42.

Next, the structure of a second modification of the first coolant supply hole is described.

Figure 7:
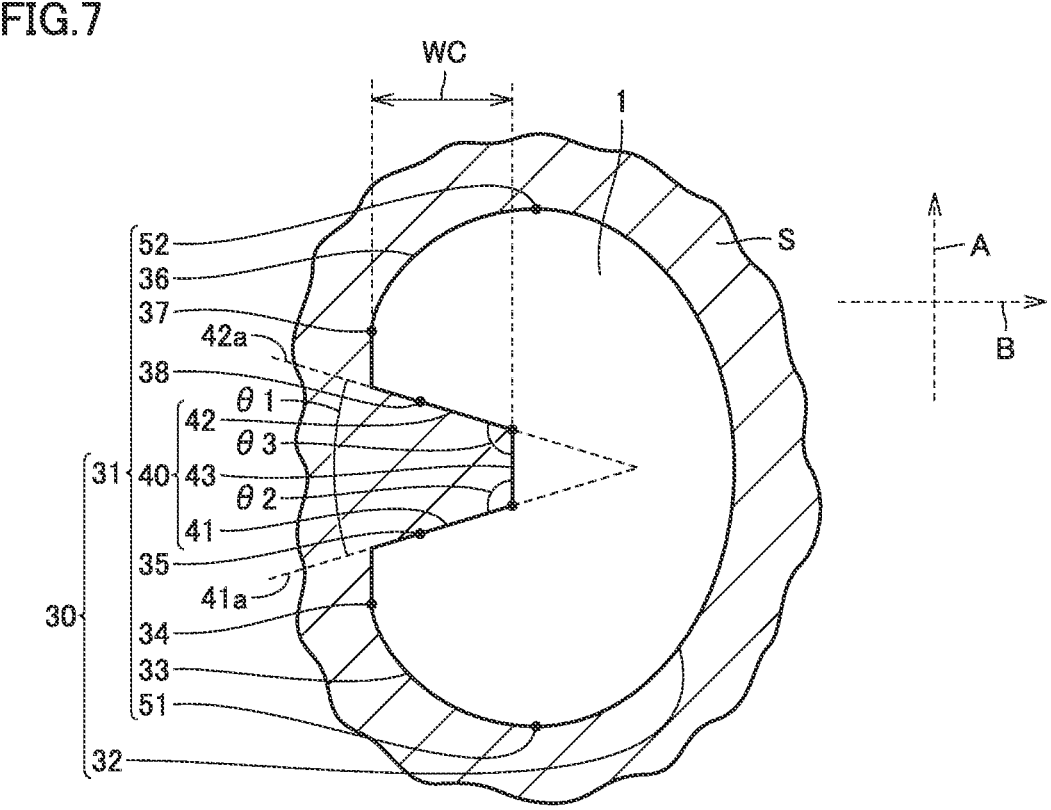
FIG. 7 is a schematic cross-sectional view showing the structure of a second modification of the first coolant supply hole.

As shown in FIG. 7, concave portion 40 may be defined by linear first side portion 41, linear second side portion 42, and linear bottom 43. A direction in which bottom 43 extends may be substantially parallel to first direction A. A second angle θ2 formed by first side portion 41 and bottom 43 is not less than 90°, for example. Similarly, a third angle θ3 formed by second side portion 42 and bottom 43 is not less than 90°, for example. Second angle θ2 may be the same as or different from third angle θ3.

First tangent 41a is a line along first side portion 41. Similarly, second tangent 42a is a line along second side portion 42. If both second angle θ2 and third angle θ3 are 90°, when viewed from the direction parallel to axis O, angle θ1 formed by first tangent 41a of first side portion 41 and second tangent 42a of second side portion 42 is 0°.

Next, the structure of a third modification of the first coolant supply hole is described.

Figure 8:
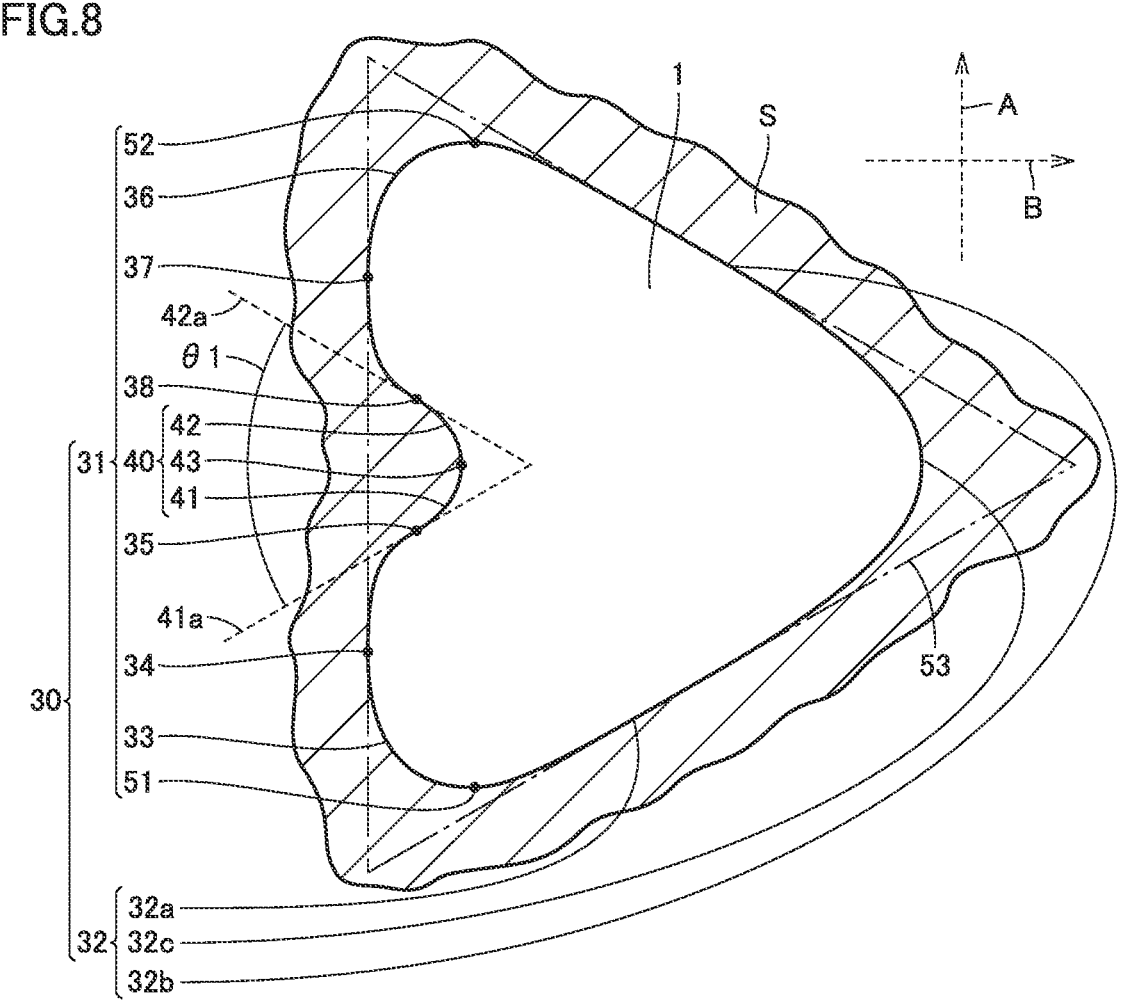
FIG. 8 is a schematic cross-sectional view showing the structure of a third modification of the first coolant supply hole.

As shown in FIG. 8, outer shape 30 of first coolant supply hole 1 may be inscribed in an imaginary triangle 53. Specifically, the first portion has concave portion 40, first convex portion 33 continuous with first side portion 41, and second convex portion 36 continuous with second side portion 42. First convex portion 33 has a linear first facing portion 34. Similarly, second convex portion 36 has a linear second facing portion 37. Concave portion 40 is between first facing portion 34 and second facing portion 37. The second portion has a first linear portion 32a and a second linear portion 32b facing each other, and a curvature portion 32c between first linear portion 32a and second linear portion 32b.

First linear portion 32a is tilted relative to each of first facing portion 34 and second linear portion 32b. Similarly, second linear portion 32b is tilted relative to each of second facing portion 37 and first linear portion 32a. First facing portion 34 and second facing portion 37, first linear portion 32a, and second linear portion 32b are in contact with the imaginary triangle. While outer shape 30 has been described as being inscribed in the imaginary triangle in the above description, outer shape 30 is not limited to be inscribed in an imaginary triangle. Outer shape 30 may be inscribed in an imaginary quadrangle (for example, a trapezoid, a rectangle or a square), or may be inscribed in an imaginary polygon, for example.

Next, the structure of a fourth modification of the first coolant supply hole is described.

Figure 9:
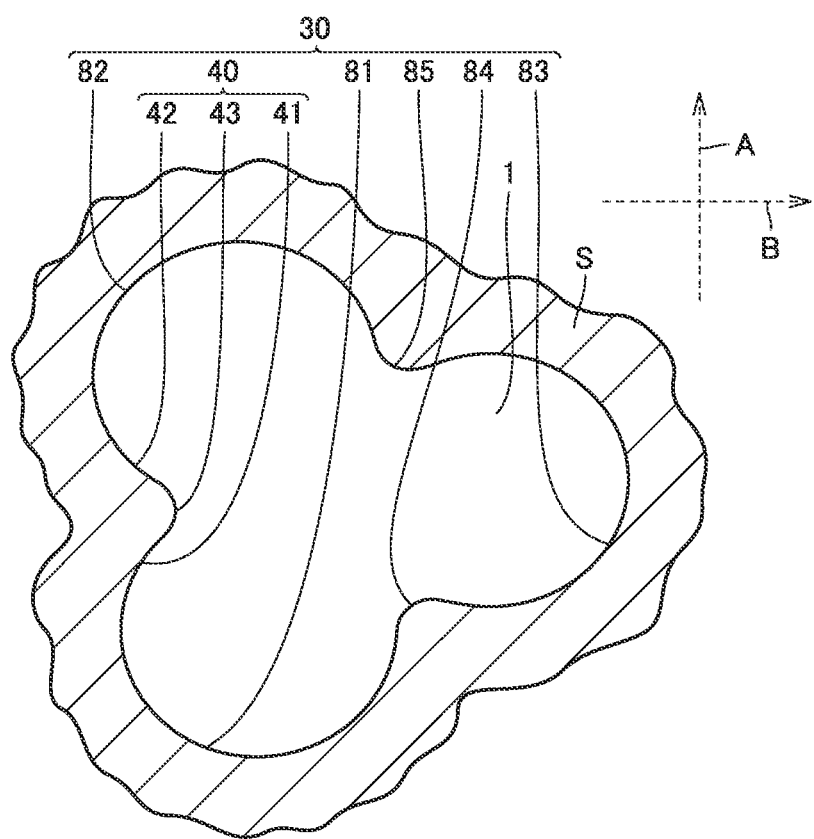
FIG. 9 is a schematic cross-sectional view showing the structure of a fourth modification of the first coolant supply hole.

As shown in FIG. 9, outer shape 30 of first coolant supply hole 1 may be a three-leaf shape. Specifically, outer shape 30 has first convex portion 81, second convex portion 82, and a third convex portion 83. First convex portion 81 is continuous with first side portion 41. Second convex portion 82 is continuous with second side portion 42. Third convex portion 83 is continuous with both first convex portion 81 and second convex portion 82.

Third convex portion 83 extends opposite to first cutting edge 13 when viewed from bottom 43 of concave portion 40. Stated another way, third convex portion 83 protrudes opposite to first cutting edge 13. Second convex portion 82 extends toward outer peripheral end portion 71 of first cutting edge 13. First recessed portion 84 serving as a boundary between first convex portion 81 and third convex portion 83 is opposite to second convex portion 82 when viewed from the inside of outer shape 30. First recessed portion 84 faces first heel portion 18. First convex portion 81 extends toward axis O. Second recessed portion 85 serving as a boundary between second convex portion 82 and third convex portion 83 is opposite to first convex portion 81 when viewed from the inside of outer shape 30. Second recessed portion 85 faces first outer peripheral portion 16.

As shown in FIGS. 3 and 9, when viewed from the direction parallel to axis O, the shape of first flank face 10 and the shape of second flank face 20 have point symmetry. Similarly, when viewed from the direction parallel to axis O, the shape of first cutting edge 13 and the shape of second cutting edge 23 have point symmetry. Similarly, when viewed from the direction parallel to axis O, outer shape 30 of the first coolant supply hole and the outer shape of second coolant supply hole 2 have point symmetry. Thus, as with the case of first opening 50, the coolant from second opening 60 is effectively supplied to central portion C and outermost peripheral portion D of second front flank face 21. That is, the coolant is effectively supplied toward the central portion and the outermost peripheral portion of second cutting edge 23.

Next, the structure of a modification of the drill according the present embodiment is described.

Figure 10:
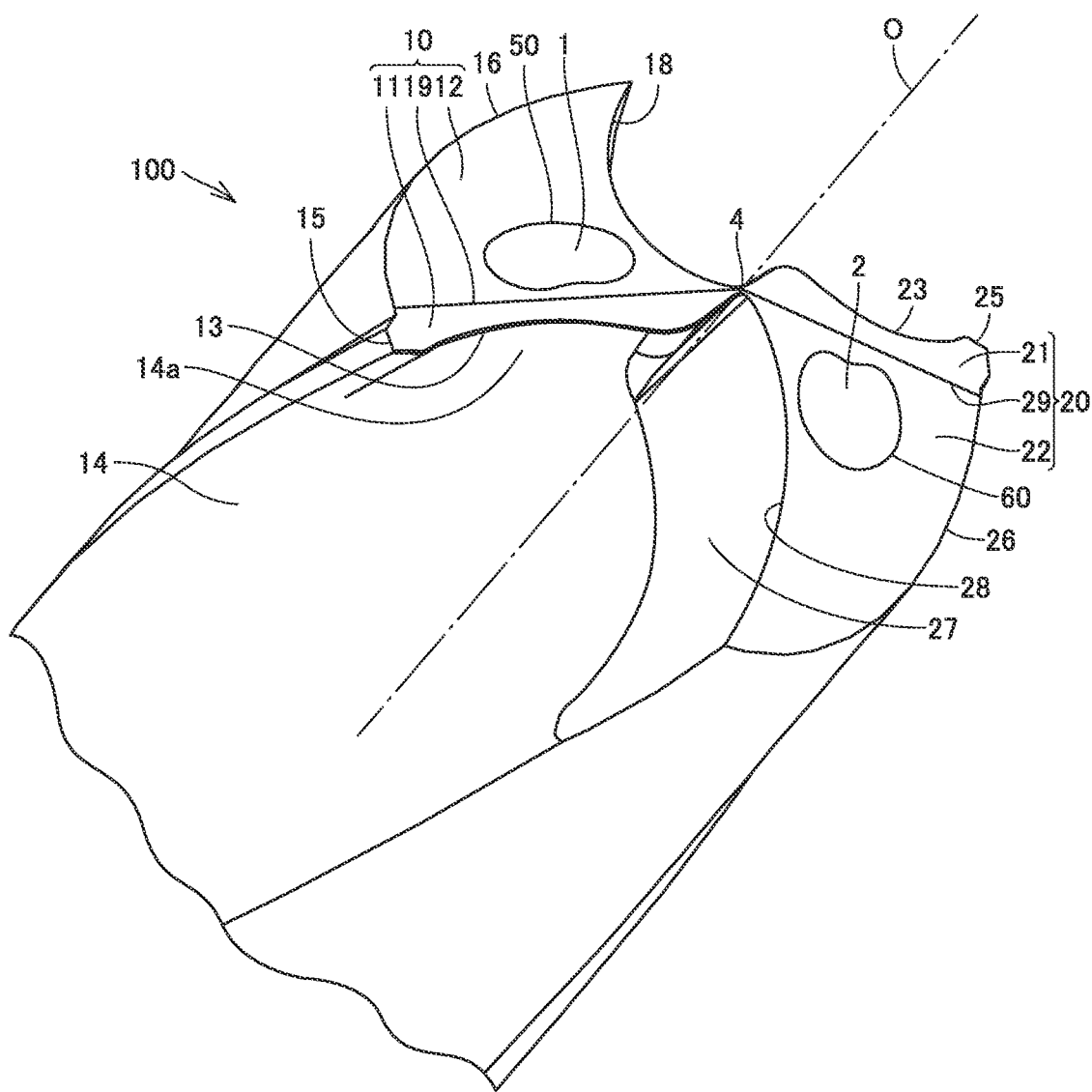
FIG. 10 is a schematic perspective view showing the structure of a modification of the drill according to the present embodiment.
Figure 11:
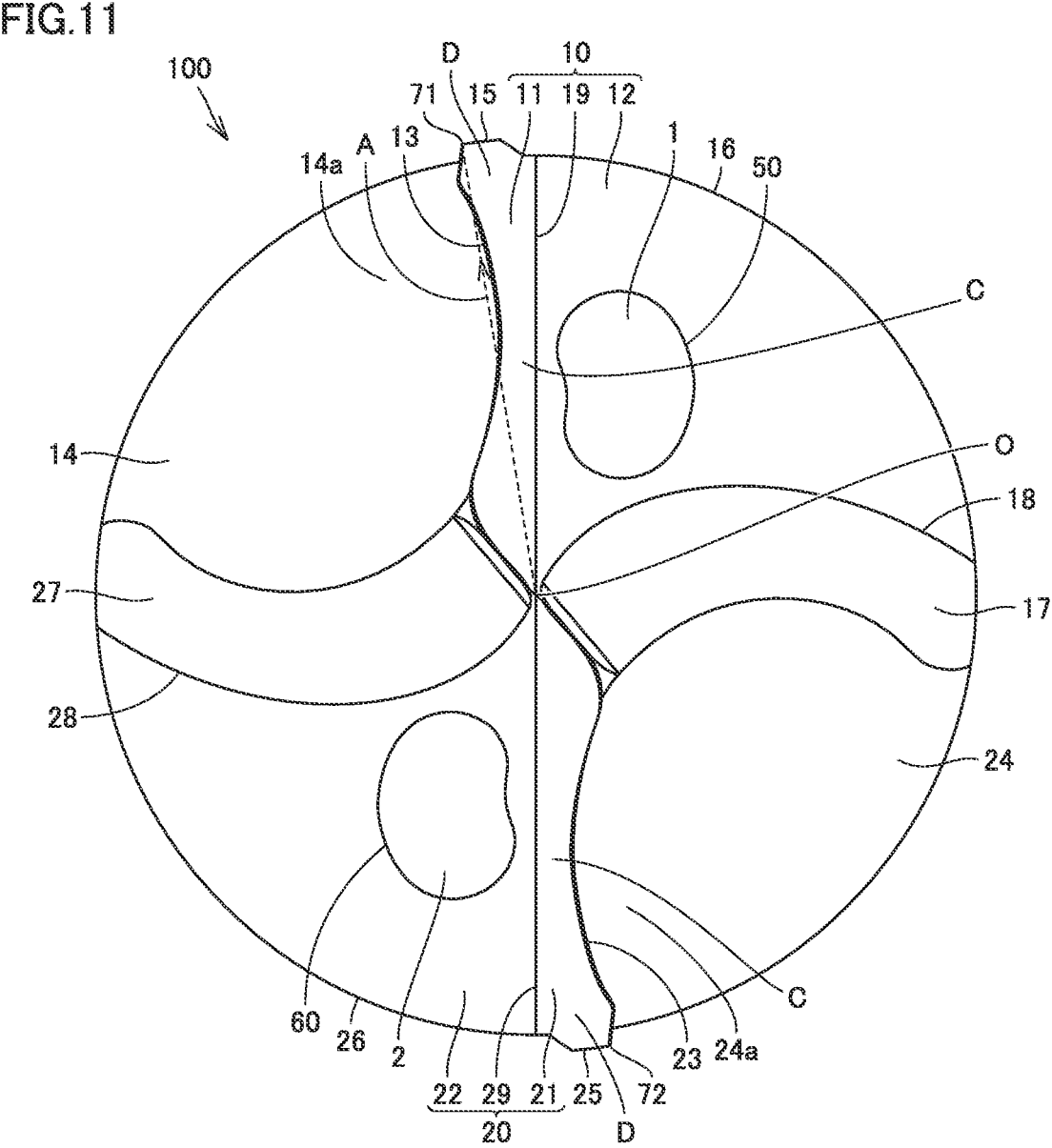
FIG. 11 is a schematic front view showing the structure of the modification of the drill according to the present embodiment.

As shown in FIGS. 10 and 11, first opening 50 is surrounded by first cutting edge 13, first heel portion 18, and first outer peripheral portion 16. First opening 50 has a kidney shape. First flank face 10 is continuous with first heel face 17 at first heel portion 18. First heel face 17 is continuous with second groove portion 24. First heel portion 18 may be elongated in an arc shape when viewed from the direction parallel to axis O. Similarly, second flank face 20 is continuous with second heel face 27 at second heel portion 28. Second heel face 27 is continuous with first groove portion 14. Second heel portion 28 may be elongated in an arc shape when viewed from the direction parallel to axis O.

First heel portion 18 generally has a linear shape. In the case of a linear shape, however, it is conceivable that first heel portion 18 and first coolant supply hole 1 may intersect each other due to dimensional variations. In this case, the coolant is more likely to flow to first heel face 17. As a result, a supply amount of the coolant to flank face 10 may be reduced, albeit slightly. By employing an arc shape as the shape of first heel portion 18 as shown in FIG. 11, the coolant can be more effectively supplied to first flank face 10. Similarly, by employing an arc shape as the shape of second heel portion 28, the coolant can be more effectively supplied to second flank face 20.

The cutting tool is not limited to a drill, as long as it is a rotary cutting tool capable of cutting a workpiece while rotating around axis O. The cutting tool may be an end mill with an end cutting edge and a peripheral cutting edge, for example, and a similar effect is achieved also with an indexable tool.

Figure 12:
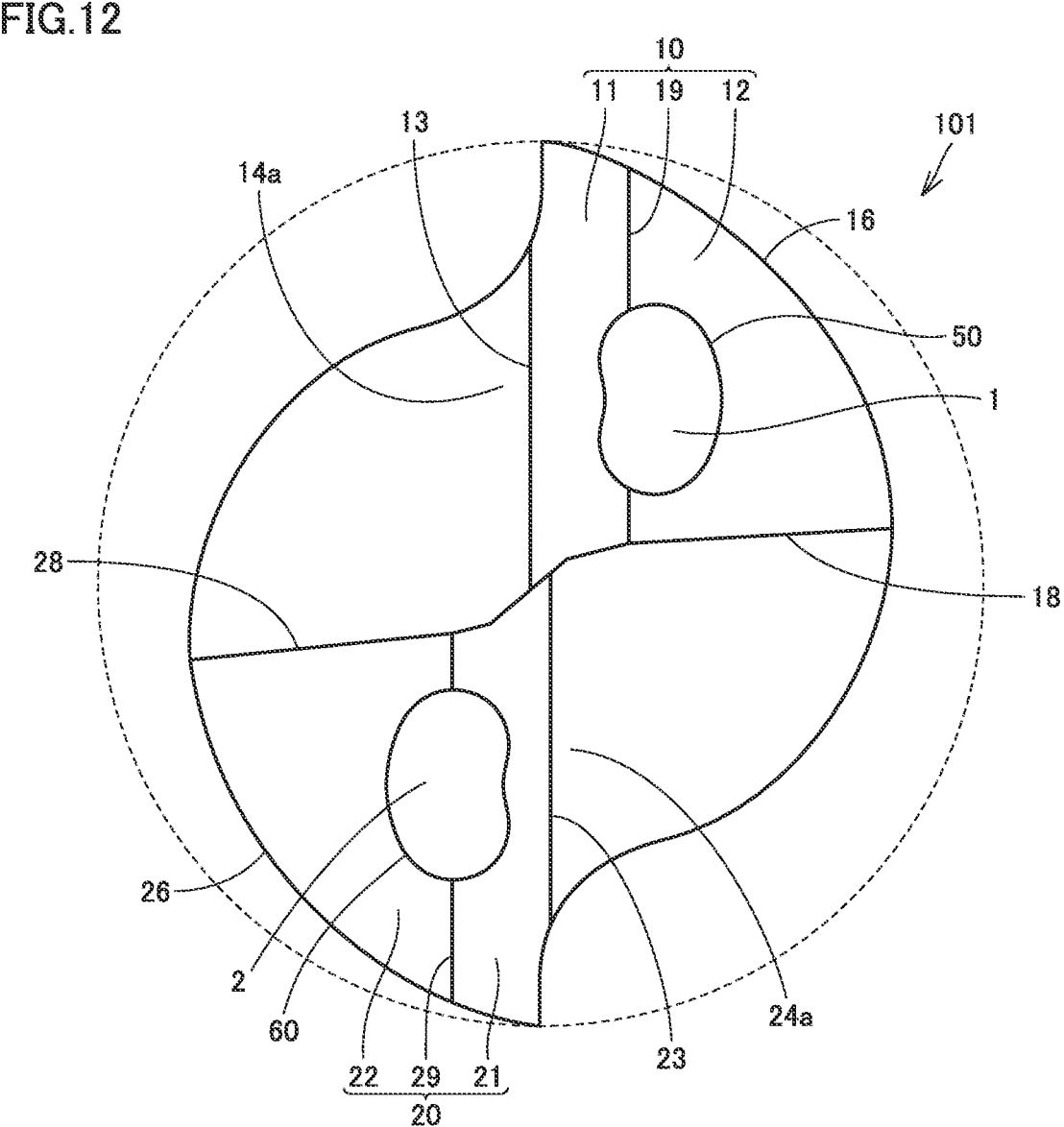
FIG. 12 is a schematic front view showing the structure of an end mill according to the present embodiment.

As shown in FIG. 12, an end mill 101 mainly has first rake face 14a, first flank face 10, second rake face 24a, and second flank face 20, for example. A ridgeline between first rake face 14a and first flank face 10 forms a first end cutting edge 13. Similarly, a ridgeline between second rake face 24a and second flank face 20 forms a second end cutting edge 23.

First flank face 10 includes first front flank face 11 and first rear flank face 12. First opening 50 of first coolant supply hole 1 is provided to straddle first front flank face 11 and first rear flank face 12, for example. Stated another way, first opening 50 is provided to traverse boundary 19 between first front flank face 11 and first rear flank face 12. Similarly, second flank face 20 includes second front flank face 21 and second rear flank face 22. Second opening 60 of second coolant supply hole 2 is provided to straddle second front flank face 21 and second rear flank face 22. Stated another way, second opening 60 is provided to traverse boundary 29 between second front flank face 21 and second rear flank face 22.

Next, the function and effect of the cutting tool according the present embodiment will be described.

In accordance with cutting tool 100 according to the present embodiment, first portion 31 facing first cutting edge 13 has concave portion 40, and angle θ1 formed by tangent 41a of first side portion 41 and tangent 42a of second side portion 42 of concave portion 40 is not more than 160°. Accordingly, the coolant can be effectively supplied toward the central portion of first cutting edge 13. In addition, since concave portion 40 extends toward second portion 32, the thickness between first cutting edge 13 and outer shape 30 can be ensured. As a result, a flow rate of the coolant can be increased while reduction in strength of cutting tool 100 is minimized.

Furthermore, in accordance with cutting tool 100 according to the present embodiment, second portion 32 has an outwardly convex shape. By narrowing the dimension of second portion 32 located rearward in the rotational direction, a flow rate of a cutting fluid toward first cutting edge 13 located forward in the rotational direction can be increased.

Furthermore, in accordance with cutting tool 100 according to the present embodiment, when viewed from the direction parallel to axis O, in first direction A parallel to the line connecting outer peripheral end portion 71 of first cutting edge 13 and axis O, outer shape 30 has narrowed portion 39 decreasing in dimension in second direction B perpendicular to first direction A, from axis O toward outer peripheral end portion 71. Accordingly, the coolant can be effectively supplied toward the outermost peripheral portion of first cutting edge 13.

Furthermore, in accordance with cutting tool 100 according to the present embodiment, when viewed from the direction parallel to axis O, the maximum dimension of outer shape 30 in first direction A is greater than the dimension of outer shape 30 from first portion 31 to second portion 32 in second direction B. Accordingly, the coolant can be more effectively supplied toward the outermost peripheral portion of first cutting edge 13.

Furthermore, in accordance with cutting tool 100 according to the present embodiment, outer shape 30 has first convex portion 81 continuous with first side portion 41, second convex portion 82 continuous with second side portion 42, and third convex portion 83 continuous with both first convex portion 81 and second convex portion 82. Third convex portion 83 extends opposite to cutting edge 13 when viewed from bottom 43. Accordingly, the flow rate of the coolant can be increased.

Furthermore, cutting tool 100 according to the embodiment described above allows the cross-sectional area of the coolant supply hole to be increased to increase the supply amount of the cutting fluid, while maintaining the strength of the cutting tool at a conventional level. Furthermore, cutting tool 100 according to the embodiment described above allows effective supply of the coolant toward the central portion and the outermost peripheral portion of the cutting edge, where sufficient delivery of the coolant has been conventionally difficult. Accordingly, not only smooth swarf ejection is facilitated by the increased cutting fluid, but also a cutting edge which increases in temperature can be effectively cooled and lubricated to allow stable and highly efficient cutting for a workpiece having a low thermal conductivity such as stainless steel. Moreover, abrasion can be reduced by the suppression of the temperature increase in the cutting edge, so that a tool can be used for a longer period of time, which contributes to tool cost reduction at a use site.

EXAMPLE 1

(Preparation of Samples)

Figure 13:
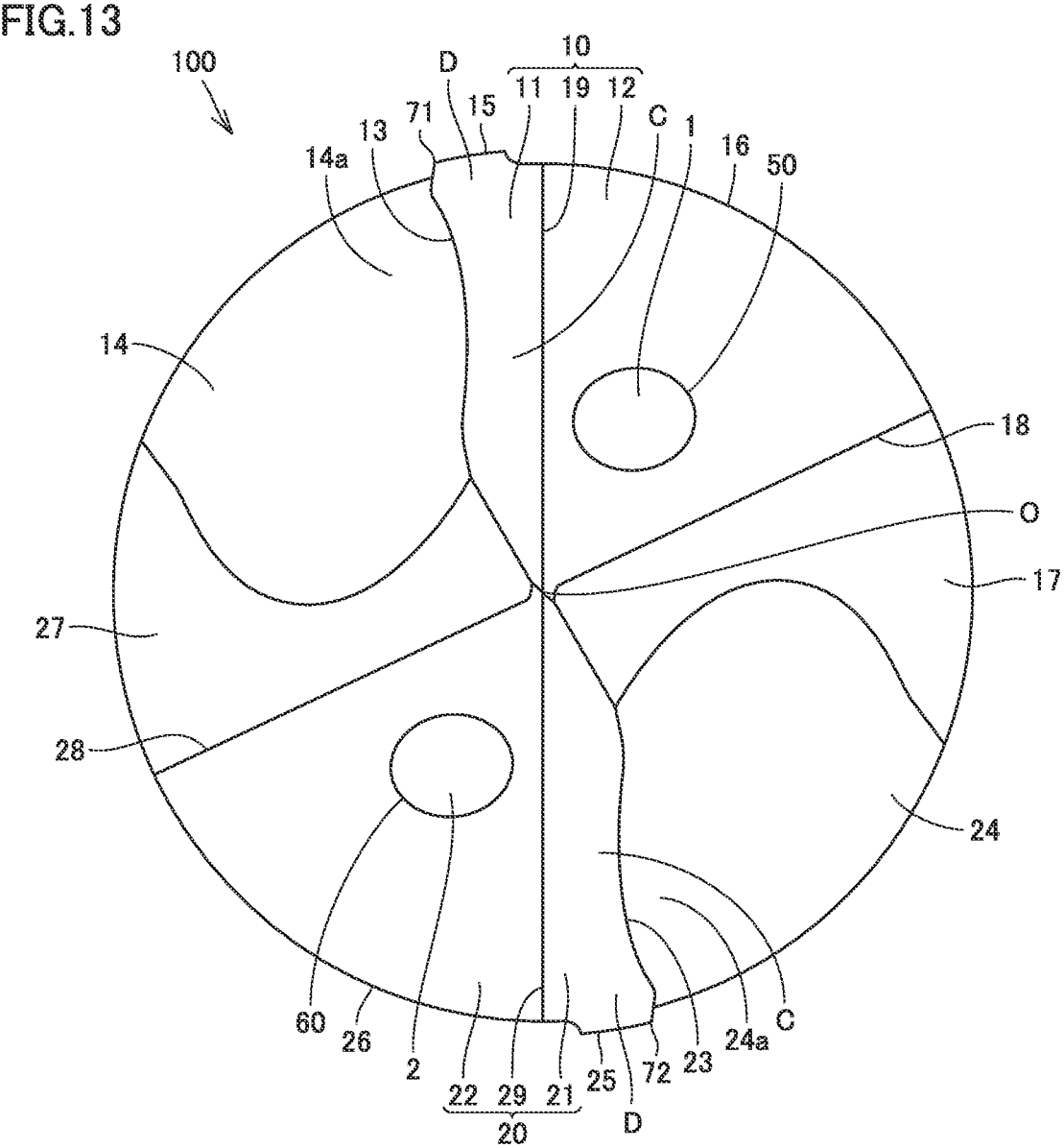
FIG. 13 is a schematic front view showing the structure of a drill according to Sample 1.
Figure 14:
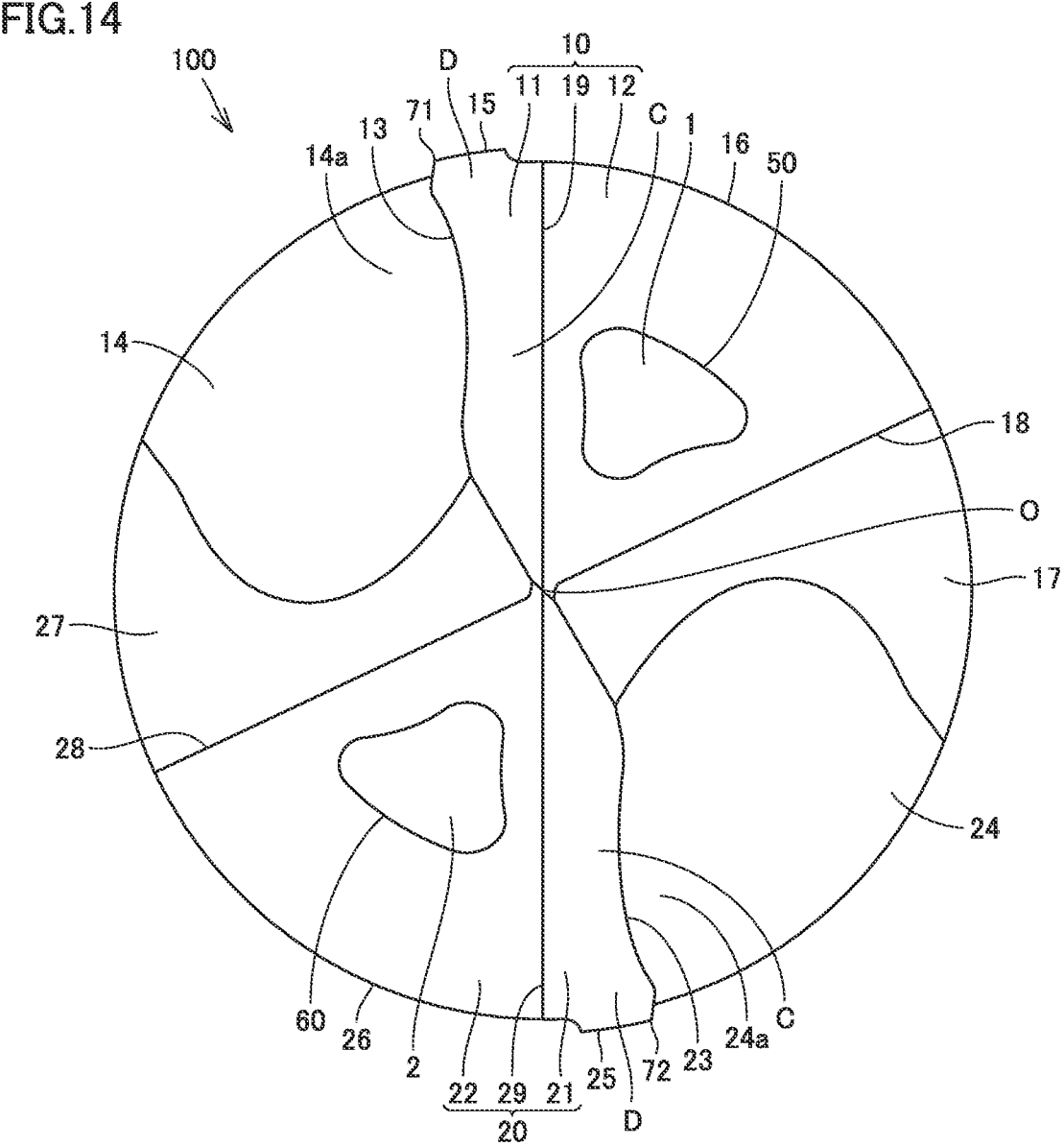
FIG. 14 is a schematic front view showing the structure of a drill according to Sample 2.
Figure 15:
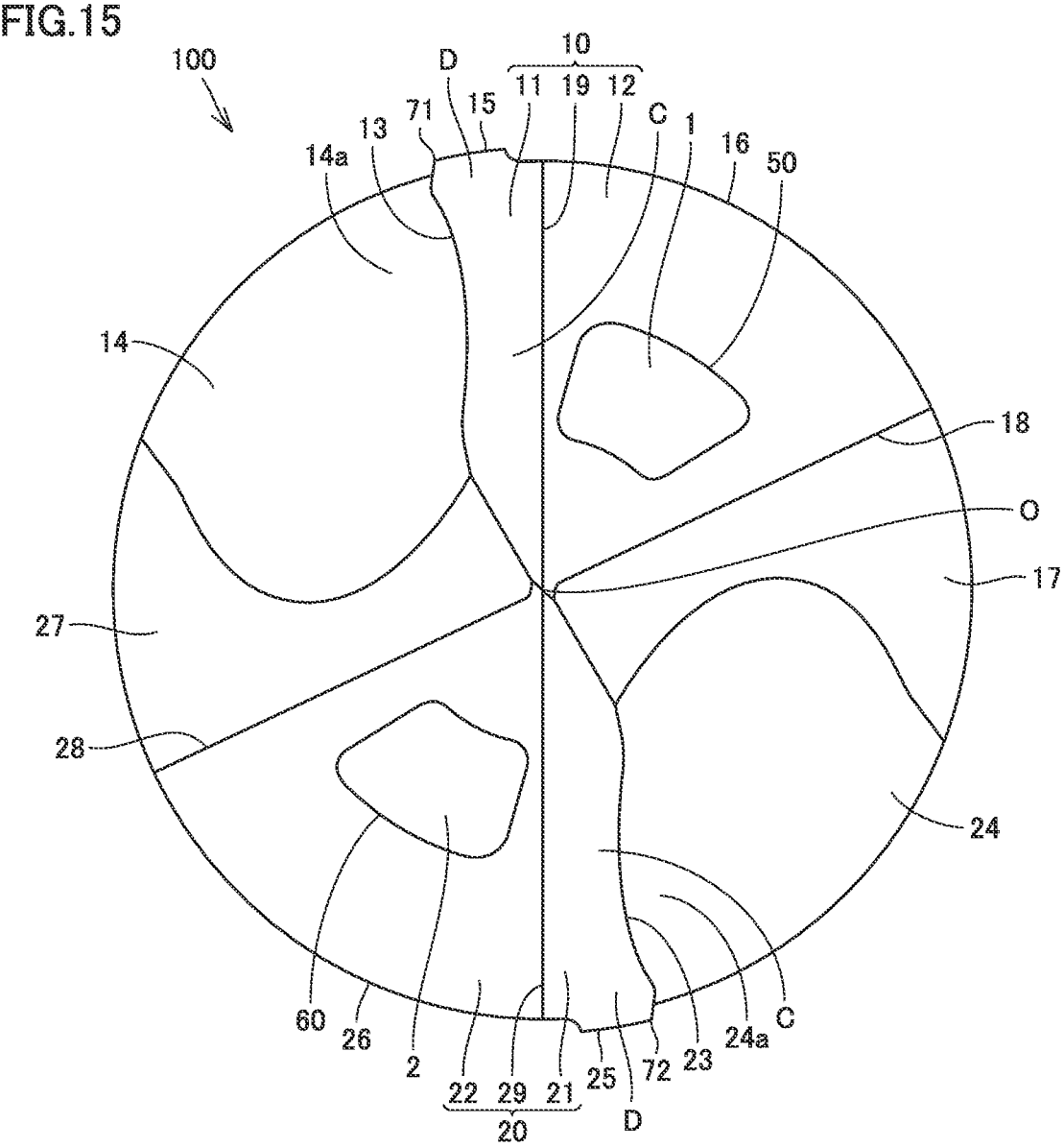
FIG. 15 is a schematic front view showing the structure of a drill according to Sample 3.
Figure 16:
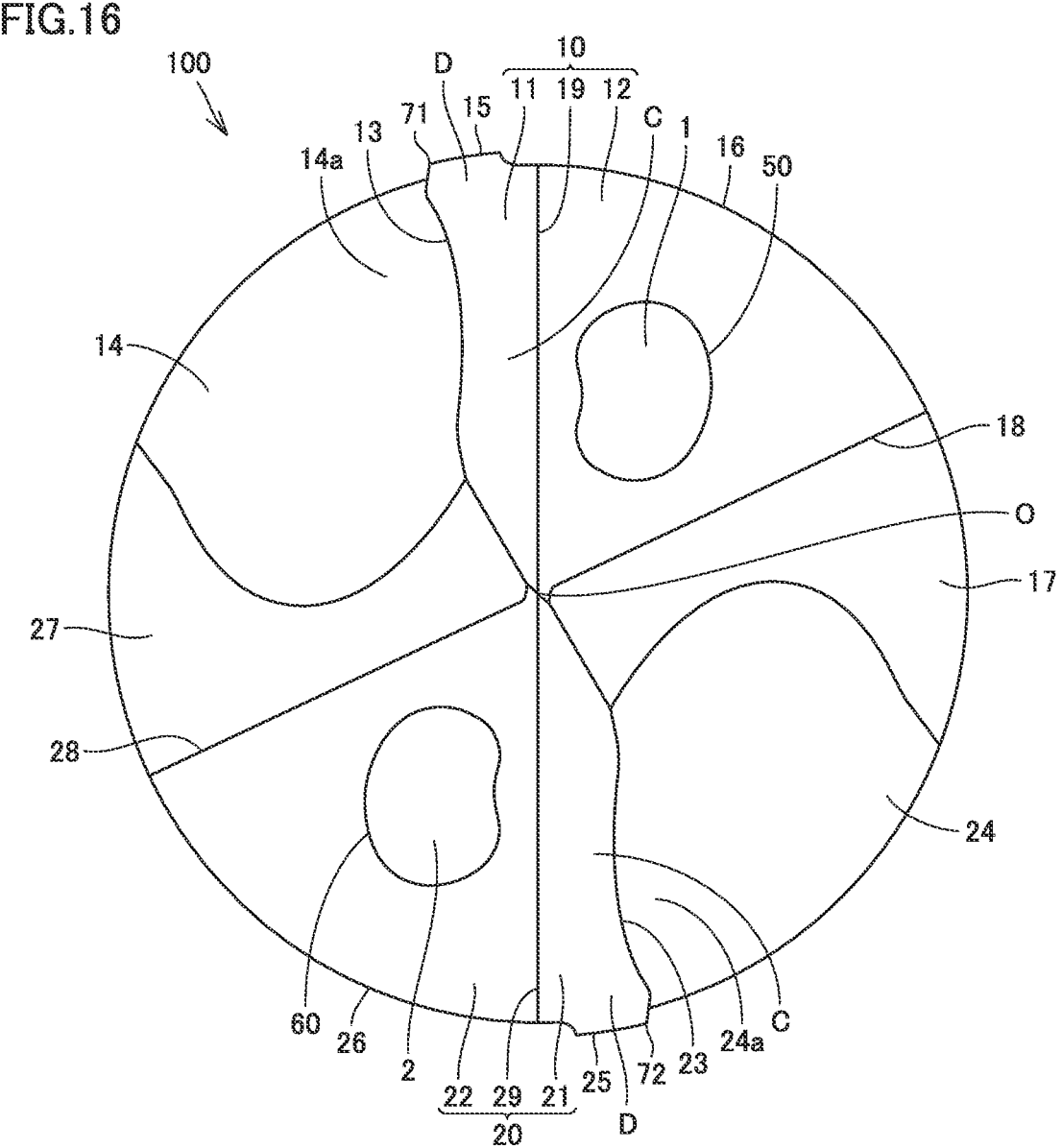
FIG. 16 is a schematic front view showing the structure of a drill according to Sample 4.

First, models of cutting tool 100 according to Samples 1 to 4 having different cross-sectional shapes of the coolant supply hole were prepared. As shown in FIG. 13, the model of cutting tool 100 according to Sample 1 has substantially round coolant supply hole 1. Coolant supply hole 1 has a cross-sectional area of 1.6 mm$^2$. As shown in FIG. 14, the model of cutting tool 100 according to Sample 2 has substantially triangular coolant supply hole 1. Coolant supply hole 1 has a cross-sectional area of 3.0 mm$^2$. As shown in FIG. 15, the model of cutting tool 100 according to Sample 3 has substantially trapezoidal coolant supply hole 1. Coolant supply hole 1 has a cross-sectional area of 3.0 mm$^2$. As shown in FIG. 16, the model of cutting tool 100 according to Sample 4 has kidney-shaped coolant supply hole 1. Coolant supply hole 1 has a cross-sectional area of 3.0 mm$^2$.

(Evaluation Method)

The models of cutting tool 100 according to Samples 1 to 4 were used to calculate, by fluid simulation, a discharge rate per minute of the coolant, and an average flow speed at first front flank face 11 and second front flank face 21 (that is, the primary relief). The drill had a diameter of 8.0 mm. The drill had a peripheral speed of 80 m/minute. The coolant introduced into first coolant supply hole 1 and second supply hole 2 had an inflow pressure of 2.0 MPa.

(Evaluation Results)

Figure 17:
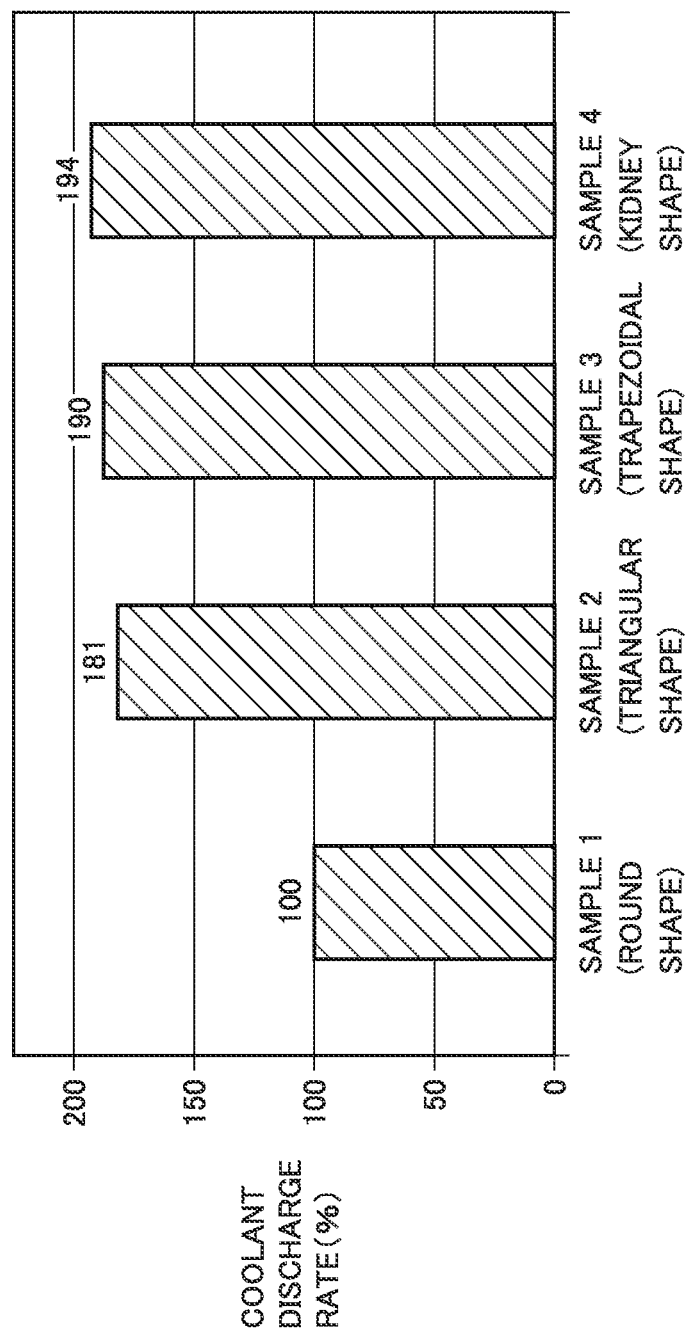
FIG. 17 shows relation between a coolant discharge rate and the shape of a coolant supply hole.

FIG. 17 shows relation between the coolant discharge rate and the shape of the coolant supply hole. The coolant discharge rate is a total flow rate of the coolant flowing out of the coolant supply hole per minute. In FIG. 17, the coolant discharge rate of each sample is relatively indicated, with the coolant discharge rate of the model of the cutting tool according to Sample 1 being 100(%). As shown in FIG. 17, the cutting tools according to Samples 2 to 4 have higher coolant discharge rates than that of the cutting tool according to Sample 1. That is, it was confirmed that the discharge rate of the cutting fluid is increased by increasing the cross-sectional area of coolant supply hole 1. It was also confirmed that, when coolant supply holes 1 have the same cross-sectional area, the cutting tool according to Sample 4 having kidney-shaped coolant supply hole 1 has a higher discharge rate of the cutting fluid than those of the cutting tools according to Sample 2 having substantially triangular coolant supply hole 1 and Sample 3 having substantially trapezoidal coolant supply hole 1.

Figure 18:
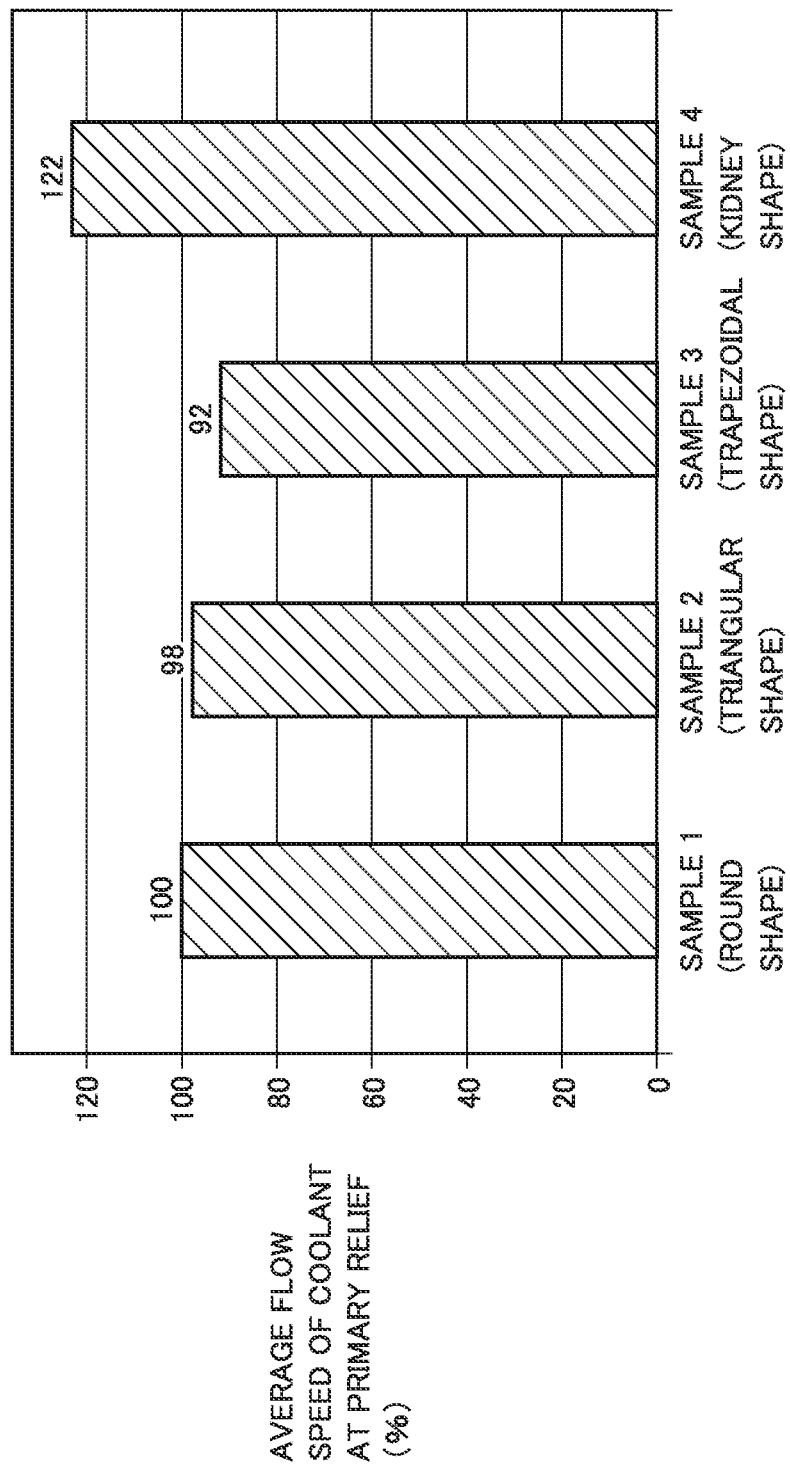
FIG. 18 shows relation between an average flow speed of a coolant at a primary relief and the shape of a coolant supply hole.

FIG. 18 shows relation between the average flow speed of the coolant at the primary relief and the shape of the coolant supply hole. In FIG. 18, the average flow speed of the coolant of each sample is relatively indicated, with the average flow speed of the coolant of the model of the cutting tool according to Sample 1 being 100(%). As shown in FIG. 18, the cutting tools according to Samples 2 and 3 have lower average flow speeds of the coolant at the primary relief than that of the cutting tool according to Sample 1. That is, it was confirmed that the average flow speed of the coolant at the primary relief is not increased only by increasing the cross-sectional area of coolant supply hole 1. Meanwhile, the cutting tool according to Sample 4 had an average flow speed of the coolant at the primary relief which was 22% higher than that of the cutting tool according to Sample 1. That is, it was confirmed that the discharge rate of the coolant can be increased and the average flow speed of the coolant at the primary relief can be increased by employing a kidney shape as the cross-sectional shape of coolant supply hole 1.

EXAMPLE 2

(Preparation of Samples)

Next, models of cutting tool 100 each having a kidney shape as the cross-sectional shape of the coolant supply hole and having different tangent angles θ1 of concave portion 40 were prepared. Tangent angle θ1 is angle θ1 formed by first tangent 41a and second tangent 42a as described above (see FIG. 5). The models were made to have tangent angles θ1 varying from 180° to 40° of concave portion 40 in outer shape 30 such as the shape as shown in FIG. 5.

(Evaluation Method)

The average flow speed of the coolant at each tangent angle was calculated by fluid simulation. First convex portion 33 and second convex portion 36 each had a radius of curvature of 0.49 mm. Second portion 32 had a radius of curvature of 1.05 mm. The drill had a diameter of 8.0 mm. The drill had a peripheral speed of 80 m/minute. The coolant introduced into first coolant supply hole 1 and second coolant supply hole 2 had an inflow pressure of 2.0 MPa.

(Evaluation Results)

Figure 19:
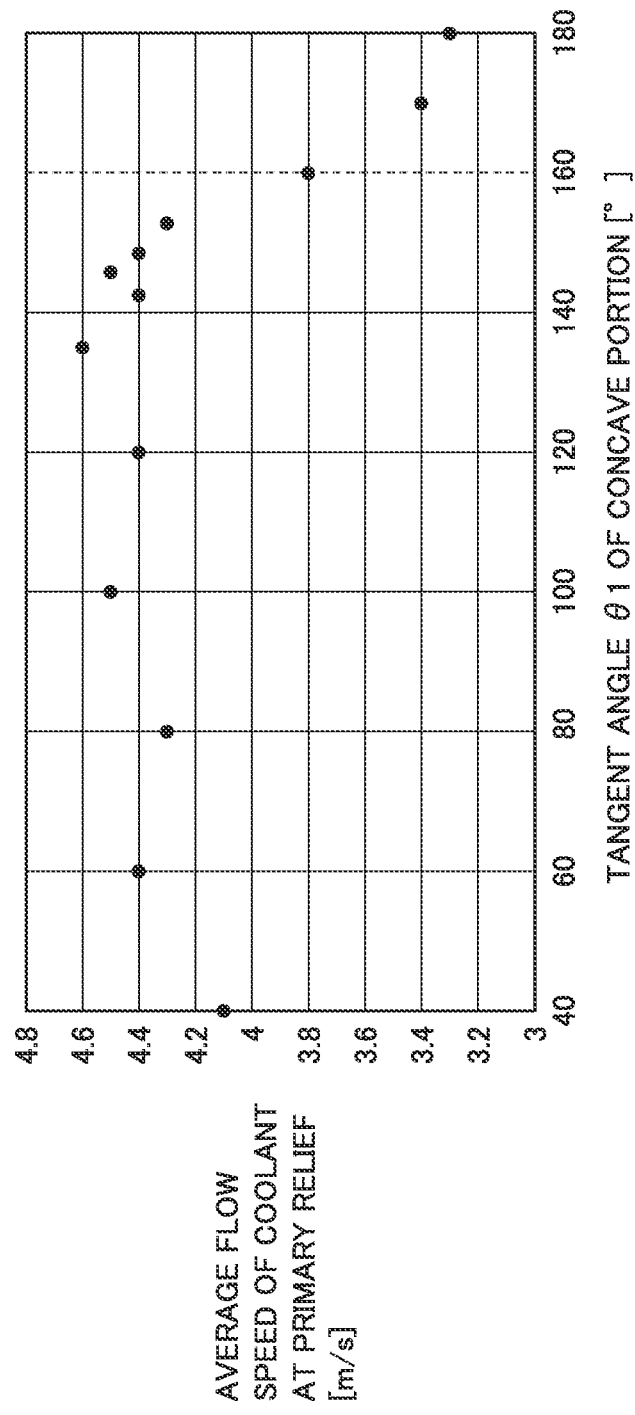
FIG. 19 shows relation between an average flow speed of a coolant at a primary relief and a tangent angle θ1 of a concave portion.

FIG. 19 shows relation between the average flow speed of the coolant at the primary relief and tangent angle θ1 of concave portion 40. As shown in FIG. 19, the average flow speed of the coolant when tangent angle θ1 is 180° is about 3.3 (m/s). As tangent angle θ1 decreases, the average flow speed of the coolant gradually increases. When tangent angle θ1 reaches 160° or less, the average flow speed of the coolant sharply increases. When tangent angle θ1 is within the range from not less than 60° to less than 160°, the average flow speed of the coolant is substantially constant and a high average flow speed is maintained. When tangent angle θ1 falls below 60°, the average flow speed of the coolant gradually decreases, but a high average flow speed is still exhibited. That is, it was demonstrated that the average flow speed of the coolant at the primary relief is increased under the condition that tangent angle θ1 is not more than 160°.

It should be understood that the embodiment and the examples disclosed herein are illustrative and non-restrictive in every respect. The scope of the present disclosure is defined by the terms of the claims, rather than the description above, and is intended to include any modifications within the scope and meaning equivalent to the terms of the claims.

REFERENCE SIGNS LIST 1 first coolant supply hole (coolant supply hole); 2 second coolant supply hole; 4 front end portion; 5 rear end portion; 6 shank portion; 10 first flank face (flank face); 14a first rake face; 11 first front flank face; 12 first rear flank face; 13 first cutting edge (cutting edge); 14 first groove portion; 15 first margin portion; 16 first outer peripheral portion; 17 first heel face; 18 first heel portion; 19, 29, 35, 38 boundary; 20 second flank face; 21 second front flank face; 22 second rear flank face; 23 second cutting edge; 24 second groove portion; 24a second rake face; 25 second margin portion; 26 second outer peripheral portion; 27 second heel face; 28 second heel portion; 30 outer shape; 31 first portion; 32 second portion; 32a first linear portion; 32b second linear portion; 32c curvature portion; 33, 81 first convex portion; 34 first vertex (first facing portion); 36, 82 second convex portion; 37 second vertex (second facing portion); 39 narrowed portion (portion); 40 concave portion; 41 first side portion; 41a first tangent (tangent); 42 second side portion; 42a second tangent (tangent); 43 bottom; 50 first opening (opening); 51, 52 portion; 53 triangle; 60 second opening; 71 outer peripheral end portion; 83 third convex portion; 84, 85 recessed portion; 100 cutting tool, drill; 101 cutting tool, end mill; A first direction; B second direction; C central portion; D outermost peripheral portion; O axis; WA maximum dimension; WB dimension; WC distance; X direction.

The invention claimed is:

1. A cutting tool configured to rotate around an axis, comprising:
a rake face; and
a flank face continuous with the rake face, wherein
the flank face is provided with a coolant supply hole,
a ridgeline between the rake face and the flank face forms a cutting edge,
an outer shape of the coolant supply hole in a cross section orthogonal to the axis includes a first portion facing the cutting edge when viewed from a direction parallel to the axis, and a second portion opposite to the cutting edge when viewed from the first portion,
the first portion has a concave portion extending toward the second portion,
the concave portion is defined by a first side portion and a second side portion facing each other, and a bottom continuous with both the first side portion and the second side portion,
in the cross section, an angle formed by a tangent of the first side portion and a tangent of the second side portion is not more than 160°,
when viewed from the direction parallel to the axis, a direction parallel to a line connecting an outer peripheral end portion of the cutting edge and the axis is a first direction, and a direction perpendicular to the first direction is a second direction, a maximum dimension of the outer shape in the first direction is greater than a maximum dimension of the outer shape in the second direction, a dimension of the concave portion in the second direction is not less than 0.03 times and not more than 0.3 times the maximum dimension of the outer shape in the second direction, and in a cross section parallel to the axis, the rake face is tilted toward an opening of the coolant supply hole relative to a straight line parallel to the axis.

2. The cutting tool according to claim 1, wherein the second portion has an outwardly convex shape.

3. The cutting tool according to claim 1, wherein when viewed from the direction parallel to the axis, in the first direction parallel to a line connecting an outer peripheral end portion of the cutting edge and the axis, the outer shape has a portion decreasing in dimension in the second direction perpendicular to the first direction, from the axis toward the outer peripheral end portion.

4. The cutting tool according to claim 3, wherein when viewed from the direction parallel to the axis, a maximum dimension of the outer shape in the first direction is greater than a dimension of the outer shape from the first portion to the second portion in the second direction.

5. The cutting tool according to claim 1, wherein the outer shape has a first convex portion continuous with the first side portion, a second convex portion continuous with the second side portion, and a third convex portion continuous with both the first convex portion and the second convex portion, and the third convex portion extends opposite to the cutting edge when viewed from the bottom.

* * * * *